Jan. 6, 1953 J. A. KOLANDA ET AL 2,624,870
AXLE GENERATOR SYSTEM
Filed July 23, 1949 3 Sheets-Sheet 1

Inventors.
Joseph A. Kolanda &
Walter P. Nevok.
By:- Mann and Brown
Atty's.

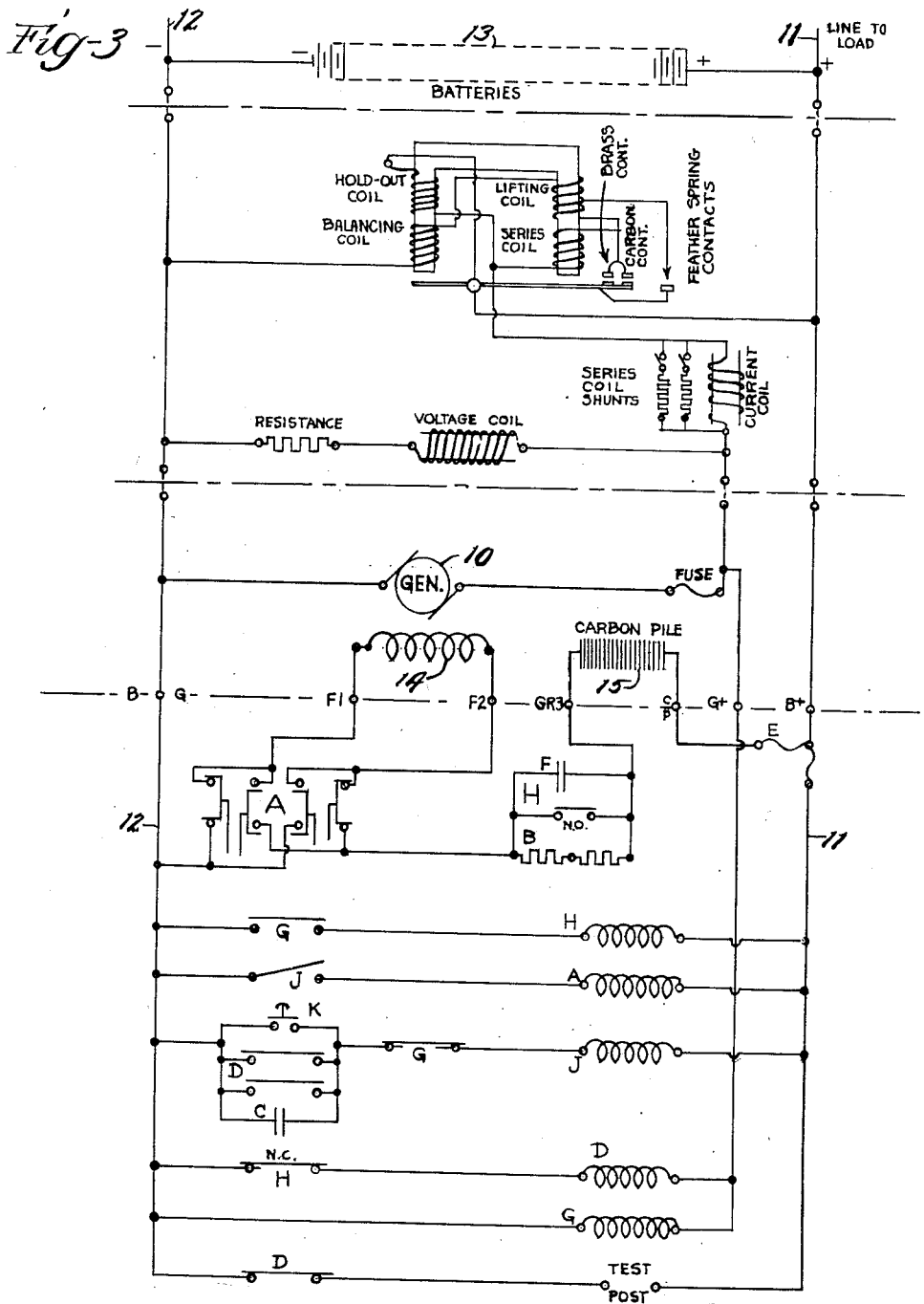

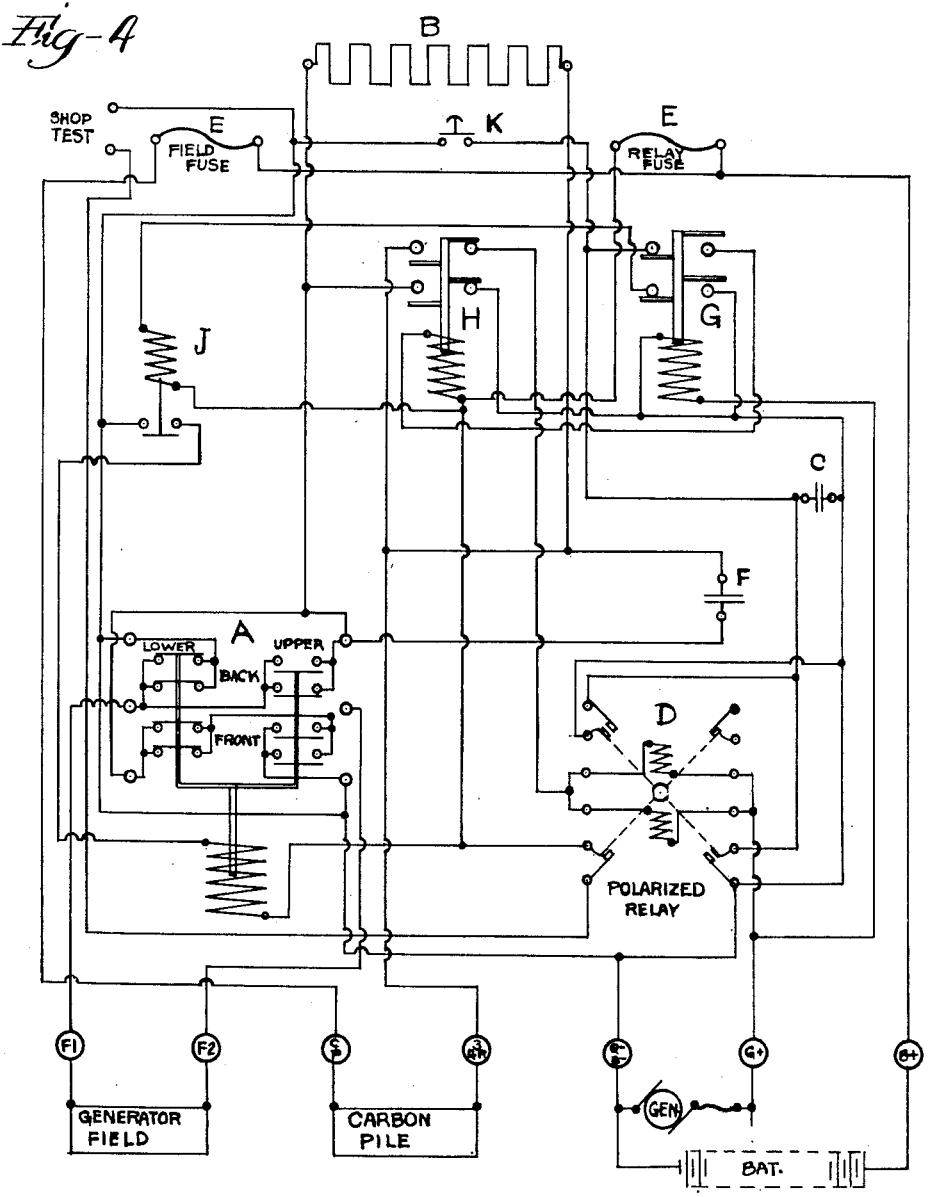

Patented Jan. 6, 1953

2,624,870

UNITED STATES PATENT OFFICE 2,624,870

AXLE GENERATOR SYSTEM

Joseph A. Kolanda, Milwaukee, and Walter P. Neuok, West Allis, Wis.

Application July 23, 1949, Serial No. 106,463

2 Claims. (Cl. 322—6)

In axle generator systems for individual railway cars, the change of direction of rotation of the armature when the car is operated in either direction causes a change of polarity, which must be corrected to maintain the relation between the generator current and battery current. Heretofore, this has been done by reversing the armature circuit by means of so-called pole changers, two types of which are in general use:

1. The rotating type; and
2. The mechanically operated switch type.

The first rotates the generator brushes through 90 degrees whenever the direction of rotation of the armature is reversed. The second includes a double-pole double-throw snap switch between the brush leads and the external leads to the generator, and a trip operated by the armature shaft when the direction of rotation is reversed.

Both devices carry the main current, and hence are large and costly, and they are on the generator down under the car, out of reach when the car is in motion. While they have long been used, they have always been a source of trouble, and when they fail the car is without current (except for the battery, of course) until it can be put out of service for repair.

The principal object of this invention is to avoid the difficulties with those two pole changers and obtain more dependable, less costly control.

Generally speaking, this is accomplished by making a reversal in direction of travel and of the direction of armature rotation reverse the circuit through the field of the generator by means of electrical devices that are located on the car and readily accessible, whether the car is in motion or at rest. A change of polarity at the generator terminals due to a change of rotation operates to reverse the current through the generator field.

Specifically, a relay responsive to mild current, such as generated when the car is started, determines the position of a field reversing switch whereby the direction of current flow in the armature circuit is maintained.

Fig. 3 is a diagram of the axle generator system embodying this invention; and

Fig. 4 is another diagram with the several parts arranged so that, placing it opposite to Fig. 2, the locations correspond.

Figure 1:
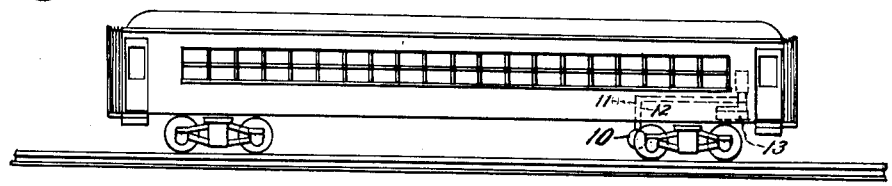
Fig. 1 is a diagrammatic side elevation of a railway passenger car with the axle generator at the right end and the panel on which the control apparatus, etc., is mounted indicated adjacent to the same end.
Figure 2:
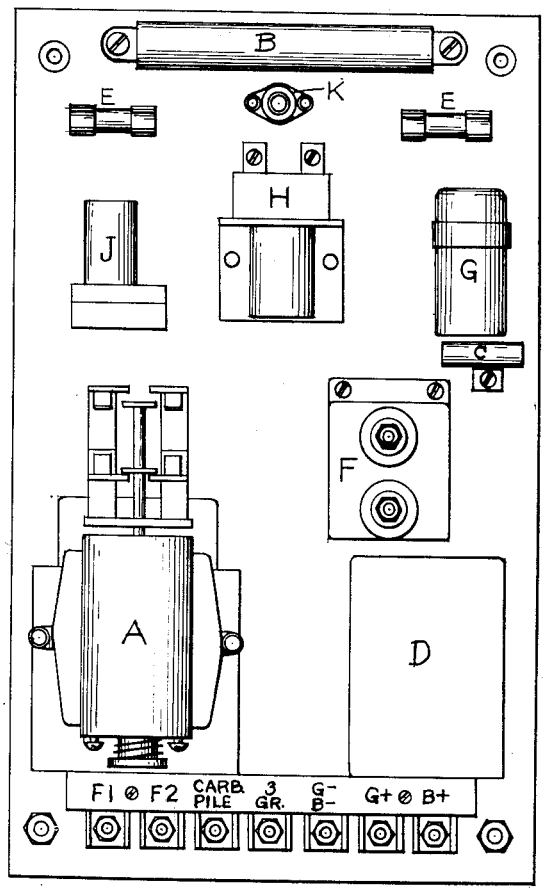
Fig. 2 is a lay-out of the panel and the apparatus thereon.

The right end of the car in Fig. 1, at which the generator is located, is commonly known as the "B" end, and is the end which is expected to be toward the locomotive in normal operation in both directions of a run, it being customary to "Y" the train at the end of a run in each direction so as to set the cars with the generators toward the locomotive.

In Fig. 3, an axle generator 10 is shown connected with the load line 11, 12 of a 38-volt system floating a battery 13 of 16 cells, the positives of the generator and the battery being connected to the line 11 and the negatives to the line 12. However, the apparatus can be applied to a 64-volt system, or to any of the others in common use.

The field 14 of the generator is shown in series with a carbon pile regulator 15 of familiar characteristics.

A is a double-pole, double-throw field reversing relay having two normally open and two normally closed contacts.

B is a 30-ohm field resistor to cut down the battery current through the field when the generator is not operating.

C is a ½ mfd. condenser shunted across the contacts of a polarity relay D having its solenoid connected across the generator. It is very sensitive and is polarized against the positive current from the right.

E is a 15 ampere fuse between the carbon pile regulator and the positive side of the line 11.

F is a 5 mfd. condenser shunted across a short circuiting relay H for the field resistor B.

G is a pilot relay connected across the generator and including two normally closed and two normally open contacts.

H is a short circuiting relay for the field resistor B.

J is a solenoid snap switch controlled by the polarity relay and having normally open contacts in circuit with the solenoid of the field reversing switch A.

K is a push button shunted across the contacts of the polarity relay D enabling the operation of snap-switch J and relay A to be tested manually when the car is at rest.

Operation

As the car is starting to the right in Fig. 1 and its generator starts rotating, it begins to generate a feeble current of low voltage. If the polarity is correct—that is, if the field reversing switch A is set for that direction—the polarity relay D will oppose the positive side of the line, and will not operate. Its contacts will be separated, and the circuit through the coil of the snap switch J will be open.

When the generator voltage builds up to approximately 5 volts, the pilot relay G will receive enough current through its coil to operate and close the normally open switch, thus closing the circuit across the line through the coil of the short circuiting relay H. The normally open contact of that relay marked N. O. then closes and shorts out the field resistor B, which has been holding down the current from the battery through the carbon pile in the filed. This results in putting the generator field directly in series with the carbon pile for regulation in the ordinary manner. The other and normally closed contact of the relay H is opened and breaks the circuit through the coil of the polarity relay D, which, being sensitive, is best not subjected continually to generator current.

The operation continues with the regulation of field current by carbon pile in the usual way until the car stops, when the customary controls indicated in the diagram throw the load onto the battery.

Assuming that the car starts to the left in Fig. 1, the generator will be rotated in the opposite direction; and, assuming the field to be set as indicated above for travel to the right, the generator will produce current in the wrong direction, its positive terminal becoming negative and its negative terminal positive. When the negative voltage builds up to approximately 1½ volts, on the right side of the polarity relay D in Fig. 3, its coil is sufficiently energized to operate the relay, closing the normally open contacts and thus closing a circuit through the coil of the solenoid snap switch J, which closes that switch and puts the line current through the coil of the field reversing switch A, which operates and reverses the polarity of the field, and the generator begins building up voltage in the right direction—positive at the right in Fig. 3 and negative at the left.

The situation, then, is such that the operation is the same as though the car had started in the normal direction, as described above.

When generator voltage builds up to approximately 5 volts, pilot relay G operates and energizes short circuiting relay H. One contact (N. O.) closes and shorts out field resistor B, putting the generator field directly in series with carbon pile of generator regulator. The other contact (N. C.) opens and breaks coil circuit of polarity relay D. Generator is now controlled normally by generator regulator.

Each time the car stops, the field resistor is put into the field circuit; and each time the car starts and the generator current is over 5 volts, the field resistor is shorted out.

Each time the car starts and the field reversing switch is set for travel in the opposite direction and the generator current reaches approximately 1.5 volts, the polarity relay D operates. That puts line current through solenoid snap switch J, which closes. That puts line current through the coil of the field reversing switch A, and it reverses the field circuit. The operating parts for reversing the field are all available within a protected position within the car and are available for examination whether the car is at rest or in motion.

We claim:

1. In an axle generator system, an axle driven generator having a shunt field, a reversing switch for the shunt field, means for determining the position of the reversing switch including a relay across the armature responsive to mild current generated when the car is started, and means responsive to the magnitude of the generator voltage for disconnecting said relay when the generator voltage exceeds a predetermined value.

2. In an axle generator system, an axle driven generator having a shunt field, a reversing switch for the shunt field, a field resistor in series with said shunt field, means for determining the position of the reversing switch including a sensitive relay across the generator armature responsive to mild current generated when the car is started, a second relay responsive to the magnitude of the generator voltage and having contacts for disconnecting said sensitive relay when the generator voltage exceeds a predetermined value, and other contacts on said second relay for short-circuiting said field resistor when said sensitive relay is disconnected.

JOSEPH A. KOLANDA.
WALTER P. NEUOK.

REFERENCES CITED

The following references are of record in the file of this patent:

UNITED STATES PATENTS

| Number | Name | Date |
|---|---|---|
| 682,220 | Moskowitz | Sept. 10, 1901 |
| 1,217,482 | Midgley et al. | Feb. 27, 1917 |
| 1,374,041 | Turbayne | Apr. 5, 1921 |
| 1,952,936 | Murakami | Mar. 27, 1934 |
| 2,461,964 | Crever | Feb. 15, 1949 |